(12) United States Patent
Herdendorf et al.

(10) Patent No.: US 11,443,775 B1
(45) Date of Patent: Sep. 13, 2022

(54) HARD DISC DRIVE WITH INTERNAL ACCESS DOOR

(71) Applicant: Seagate Technology LLC, Fremont, CA (US)

(72) Inventors: Brett R. Herdendorf, Mound, MN (US); Riyan Alex Mendonsa, Minneapolis, MN (US); Krishnan Subramanian, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/235,614

(22) Filed: Apr. 20, 2021

(51) Int. Cl.
*G11B 33/14* (2006.01)
*G11B 17/22* (2006.01)
*G11B 17/26* (2006.01)
*G11B 23/03* (2006.01)

(52) U.S. Cl.
CPC ........ *G11B 33/1446* (2013.01); *G11B 17/225* (2013.01); *G11B 17/26* (2013.01); *G11B 23/0323* (2013.01)

(58) Field of Classification Search
None
See application file for complete search history.

(56) References Cited

U.S. PATENT DOCUMENTS

| | | | |
|---|---|---|---|
| 5,381,402 A | 1/1995 | Lee et al. | |
| 5,790,485 A * | 8/1998 | Bando | G11B 17/30 369/30.61 |
| 6,754,168 B2 | 6/2004 | Hashimoto | |
| 8,958,172 B1 | 2/2015 | Hansen | |
| 8,958,173 B1 | 2/2015 | Hirano et al. | |
| 9,025,277 B1 | 5/2015 | Hirano | |

* cited by examiner

*Primary Examiner* — Craig A. Renner
(74) *Attorney, Agent, or Firm* — Holzer Patel Drennan (57) ABSTRACT

An issue facing shared read/write player hard disc drives (HDDs) is when a head-media contact event occurs, any resulting plume of debris caused by the contact event not only affects the magnetic disc currently being read or written, but other magnetic discs within the HDD enclosure. The presently disclosed technology is directed as mitigating the potential consequences of such a head-media contact event. By providing one or more internal access doors within the HDD, a magnetic disc currently being read from or written to may be physically isolated from other magnetic discs within the HDD. As a result, in the event of a head-media contact event, any resulting plume of debris caused by the contact event only affects the magnetic disc currently being read or written. The remaining magnetic discs within the HDD are isolated from the plume of debris.

20 Claims, 7 Drawing Sheets

FIG. 7

HARD DISC DRIVE WITH INTERNAL ACCESS DOOR

BACKGROUND

Hard disc drives (HDDs) are traditionally constructed with a dedicated reader/writer for each readable/writable surface of one or more magnetic discs contained within an HDD. In the interest of achieving greater data density and/or lower cost, some HDDs may include a cassette of numerous magnetic discs that share a common read/write player within an HDD enclosure. Example implementations of this HDD media arrangement may be found in cloud computing data storage, cold data storage, and HDD juke boxes, for example. Each of these implementations exchange speed in reading to and/or writing data from any one of the magnetic discs within a cassette for the lower cost of a shared read/write player and higher overall capacity in a given physical space requirement, as compared to traditional HDDs.

An issue facing shared (or common) read/write player HDDs is when a head-media contact event occurs, any resulting plume of debris caused by the contact event not only affects the magnetic disc currently being read or written, but other magnetic discs within the HDD enclosure. As a result, a head-media contact event that occurs in a shared read/write player HDD has the potential to damage not one, but potentially all magnetic discs within the HDD. This causes a potential risk of much more data loss and a greater cost of replacing multiple magnetic discs within shared read/write player HDDs, as compared to traditional HDDs. A single crash could be the same as crashing 30 or more HDDs, resulting in hundreds of hours of rebuild time, for example.

SUMMARY

Implementations described and claimed herein address the foregoing problems by providing a hard disc drive comprising a cassette including an array of magnetic discs, a shared read/write player including a receptacle to selectively receive one of the array of discs as an active disc, and one or more internal access doors. The internal access doors selectively permit access to one of the receptacle and the cassette and remain closed while the active disc is spinning. The shared read/write player accesses the active disc as it spins.

Implementations described and claimed herein address the foregoing problems by further providing a method of operating a hard disc drive comprising opening a shared read/write player door, the shared read/write player door to selectively permit physical access to a receptacle within a shared read/write player; receiving one of an array of magnetic discs from a cassette to the receptacle within the shared read/write player as an active disc, the shared read/write player to access the active disc as it spins; and closing the shared read/write player door prior to spinning the active disc within the shared read/write player, the shared read/write player to access the active disc as it spins.

Implementations described and claimed herein address the foregoing problems by still further providing a data storage rack comprising an array of hard disc drives, each within its own enclosure. The hard disc drives each include a cassette including an array of magnetic discs, a shared read/write player including a receptacle to selectively receive one of the array of discs as an active disc, and one or more internal access doors. The internal access doors selectively permit access to one of the receptacle and the cassette and remain closed while the active disc is spinning. The shared read/write player accesses the active disc as it spins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

The presently disclosed technology is directed as mitigating the potential consequences of a head-media contact event that occurs within a shared read/write player hard disc drive (HDD). In general, by providing one or more internal access doors within the shared read/write player HDD, a magnetic disc currently being read from or written to may be physically isolated from other magnetic discs within the shared read/write player HDD. As a result, in the event of a head-media contact event, any resulting plume of debris caused by the contact event only affects the magnetic disc currently being read or written. The remaining magnetic discs within the shared read/write player HDD are isolated from the plume of debris. Any event (e.g., a contamination event, such as a head/media contact event, particularly during read operations, which destroys head/media integrity) that results in a plume of debris within the HDD is referred to herein as an HDD failure or a failure event, and the presently disclosed technology is directed at addressing and mitigating the impact of such failure events.

Figure 1:
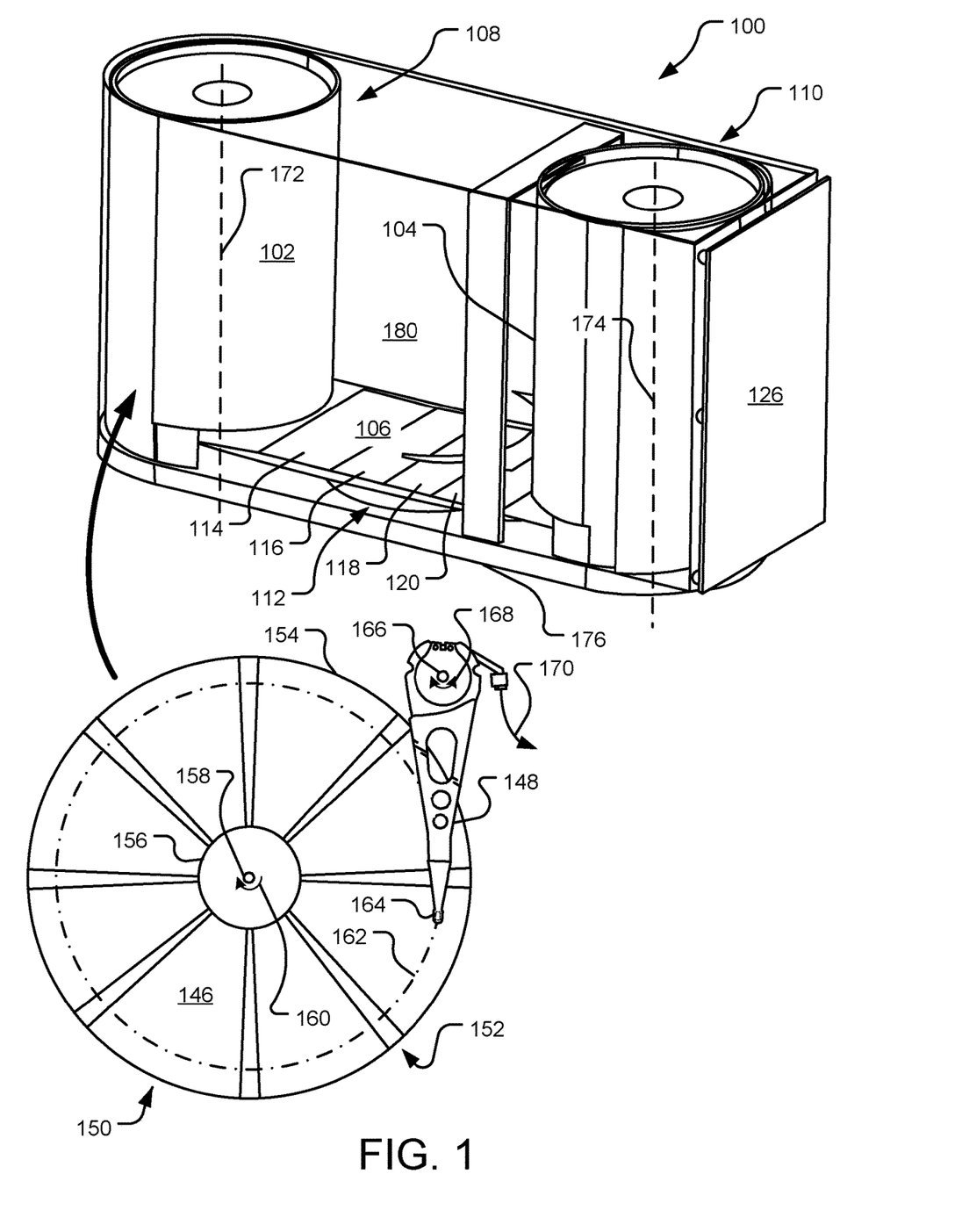
FIG. 1 illustrates an example hard disc drive (HDD) with cassette doors and a shared read/write player door all in a closed position with an example storage platter.

FIG. 1 illustrates an example hard disc drive (HDD) 100 with cassette doors 102, 104 and a shared read/write player door 106 all in a closed position with an example storage platter 146. The HDD 100 is illustrated without its enclosure (see e.g., enclosure 440 of FIG. 4) for the purposes of illustrating internal components of the HDD 100, such as cassettes 108, 110 and shared read/write player 112. Each of the cassettes 108, 110 within the HDD 100 includes a stack of storage platters (also referred to herein as storage discs or magnetic discs), such as the storage platter 146, in an inactive state (referred to herein as inactive discs). As an example, each of the cassettes 108, 110 may hold 100 storage platters for a total of 200 storage platters held within the HDD 100. The shared read/write player 112 may hold one of the storage platters from the cassettes 108, 110 in a receptacle (not shown, see e.g., receptacle 330 of FIG. 3) or tray and perform read/write operations on that storage platter, such as the storage platter 146, in an active state (referred to herein as an active disc). Storage platter 146 is described in detail below, though some or all of the storage platters within the cassettes 108, 110 may have the same or similar features. Other implementations may have one or more than two cassettes.

The storage platter 146 is a round disc arranged in a series of spaced servo wedges (e.g., servo wedge 152) and data wedges (e.g., data wedge 150) within an outer diameter 154 and an inner diameter 156 of the storage platter 146, between which are a number of substantially circular concentric data tracks making up an entirety of the readable and/or writable surface area of the storage platter 146. Specific locations on the storage platter 146 may be defined by any available addressing scheme (e.g., cylinder-head-sector (CHS) addressing and logical block addressing (LBA) schemes).

When mounted within the shared read/write player 112, the storage platter 146 rotates at high speed about platter spindle 158 (as illustrated by arrow 160), as information is written to and/or read from data tracks (e.g., track 162) within the data wedges on the storage platter 146. The information is written to and/or read from the storage platter 146 via actuator arm 148 and its respective slider 164. More specifically, in the depicted example, the actuator arm 148 pivots about actuator spindle 166 using a servo motor (or voice-coil motor (VCM), not shown) during a seek operation to locate the data track 162 on the storage platter 146, as illustrated by arrow 168. The actuator arm 148 extends toward the storage platter 146 and the slider 164 is located at an end of the actuator arm 148 distal from the actuator spindle 166. The slider 164 flies in close proximity above the storage platter 146 while the storage platter 146 rotates about the platter spindle 158. The platter spindle 158 and actuator arm 148 and its respective slider 164 are all components of the shared read/write player 112. Other implementations may include multiple actuator arms and/or sliders with associated transducer heads. Still further implementations may utilize actuator arm(s) that move linearly rather than rotationally to access data tracks on the storage platter 146.

The storage platter 146 includes an array of embedded independent magnetic domains and the slider 164 includes an array of microelectronic components (e.g., a read element, a write element, thermal actuators, other head-media spacing micro-actuators, etc., not shown). The read element is magneto-resistive, which allows it to read data from the magnetic domains as they pass underneath the read element. The write element generates magnetic fields that selectively change polarity of the magnetic domains of the storage platter 146 as they pass underneath the write element, which allows the write element to write data to the storage platter 146. A flex cable 170 provides electrical connection paths from an HDD controller (not shown, see e.g., HDD controller 242 of FIG. 2) to the various microelectronic components attached to the actuator arm 148 and the slider 164. The HDD controller may be implemented as a controller SoC or control board (e.g., incorporated on printed circuit board (PCB) 126), for example. The flex cable 170 transmits data signals from the read element and/or to the write element, while allowing pivotal movement of the actuator arm 148 during read/write operations on the storage platter 146 while mounted within the shared read/write player 112.

While a singular actuator arm 148 is illustrated accessing the depicted side of the storage platter 146, the storage platter 146 may include data storage on both planar sides of the storage platter 146 (i.e., the depicted side and its opposing non-depicted side). In such cases, the actuator arm 148 is actually a pair of actuators arms, each assigned to one of the planar sides of the storage platter 146. The pair of actuators arms may rotate together or independently about the actuator spindle 166 to read from/write to the storage platter 146.

The HDD 100 depicted with the cassette doors 102, 104 and the shared read/write player door 106, all in a closed position, is operating in one of several states. First, the HDD 100 may be in a full standby or off state, where it is not currently in use. All of the storage platters are stowed in their respective slots (or grooves within an interior wall) of the cassettes 108, 110 and the shared read/write player 112 is empty. All of the cassette doors 102, 104 and the shared read/write player door 106 are in a closed position to isolate the storage platters within the cassettes 108, 110; the internal components of the shared read/write player 112; and a remainder of an interior cavity 180 of the HDD 100, as much as possible. For example, in the depicted standby or off state, maintenance operations (e.g., repair and/or replacement of components) may be performed on the HDD 100 whereby a technician may remove the enclosure and expose the internal components to potential contamination from an external environment. With all of the cassette doors 102, 104 and the shared read/write player door 106 in a closed position, the cassettes 108, 110 and the shared read/write player 112 remain substantially isolated even when the enclosure is opened. Further, the technician may manually open one or more of the cassette doors 102, 104 and the shared read/write player door 106 as needed to perform maintenance operations (e.g., inspection, repair, or replacement) on the cassettes 108, 110 and/or the shared read/write player 112 within the HDD 100.

The HDD 100 depicted with the cassette doors 102, 104 and the shared read/write player door 106 all in a closed position may also be operating in a partial standby or an active read/write state. All of the storage platters except one are stowed in their respective slots (or grooves within an interior wall) of the cassettes 108, 110 (referred to herein as the inactive discs) and the shared read/write player 112 contains the one storage platter in its receptacle or tray, which is referred herein as the active disc. All of the cassette doors 102, 104 and the shared read/write player door 106 are in a closed position to isolate the storage platters within the cassettes 108, 110; the internal components of the shared read/write player 112, including the active disc; and a remainder of the interior cavity 180 of the HDD 100, as much as possible. When operating in the partial standby state, the active disc is loaded within the shared read/write player 112, but not currently spinning. In the partial standby state, the cassette doors 102, 104 and the shared read/write player door 106 are all available to be opened, as requested by the HDD controller, in some implementations to change the active disc, as described in further detail below.

When operating in the active read/write state, the active disc is loaded and spinning within the shared read/write player 112 and data is currently being read from or written to the active disc via actuator arm 148 and its respective slider 164. In some implementations, the active read/write state also includes time periods immediately before and immediately after a read/write operation where the active disc remains spinning, but data is not currently being read from or written to the active disc. In the active read/write state, the cassette doors 102, 104 and the shared read/write player door 106 are not available to be opened (also referred to herein as locked), as enforced by the HDD controller, particularly to protect the inactive storage platters stowed within the cassettes 108, 110 from a head-media contact event (also referred to herein as a disc crash or a failure event) within the shared read/write player 112, as discussed in further detail below.

The cassettes 108, 110 are each tucked against a fixed interior wall of the HDD 100 with an interior curvature having a radius that substantially matches a radius of the storage platters (e.g., with a +/−10% difference in radius), potentially with a clearance gap to prevent contact of the inactive storage platters with the interior walls of the HDD 100, as well as provide space for the cassette doors 102, 104 to rotate or retract between the interior walls of the HDD 100 and the inactive storage platters. The cassette doors 102, 104 are each approximately semi-cylindrical shaped shells, or shells shaped at somewhat greater than half of a cylinder, such as 185-200 degrees, to selectively provide an overlap with the fixed interior wall of the HDD 100. The cassette doors 102, 104 are adapted to rotate about central axes 172, 174, respectively, of the storage platters within the cassettes 108, 110. When opened, the cassette doors 102, 104 rotate approximately 180 degrees from their closed position, as illustrated in FIG. 1, to an open position, such as that as illustrated by HDD 200 of FIG. 2.

The cassette doors 102, 104 allow the cassettes 108, 110 to be independently isolated in case the HDD 100 interior cavity 180 requires cleaning or other components within the HDD 100 interior cavity 180 require replacement. The cassette doors 102, 104 also provide isolation redundancy within the HDD 100 in conjunction with the shared read/write player door 106. The cassette doors 102, 104 may also be used to secure the storage platters within their cassettes 108, 110 for portability. For example, if one of the cassettes 108, 110 is to be replaced, the corresponding one of the cassette doors 102, 104 may be closed to secure the storage platters in place as the cassette is removed from the HDD 100. For further example, if the HDD 100 is to be relocated, the cassette doors 102, 104 may be closed to secure all the inactive storage platters in place as the HDD 100 is moved to a new physical location. This is referred to herein as a portability state of the cassettes 108, 110 and the HDD 100 overall.

Figure 3:
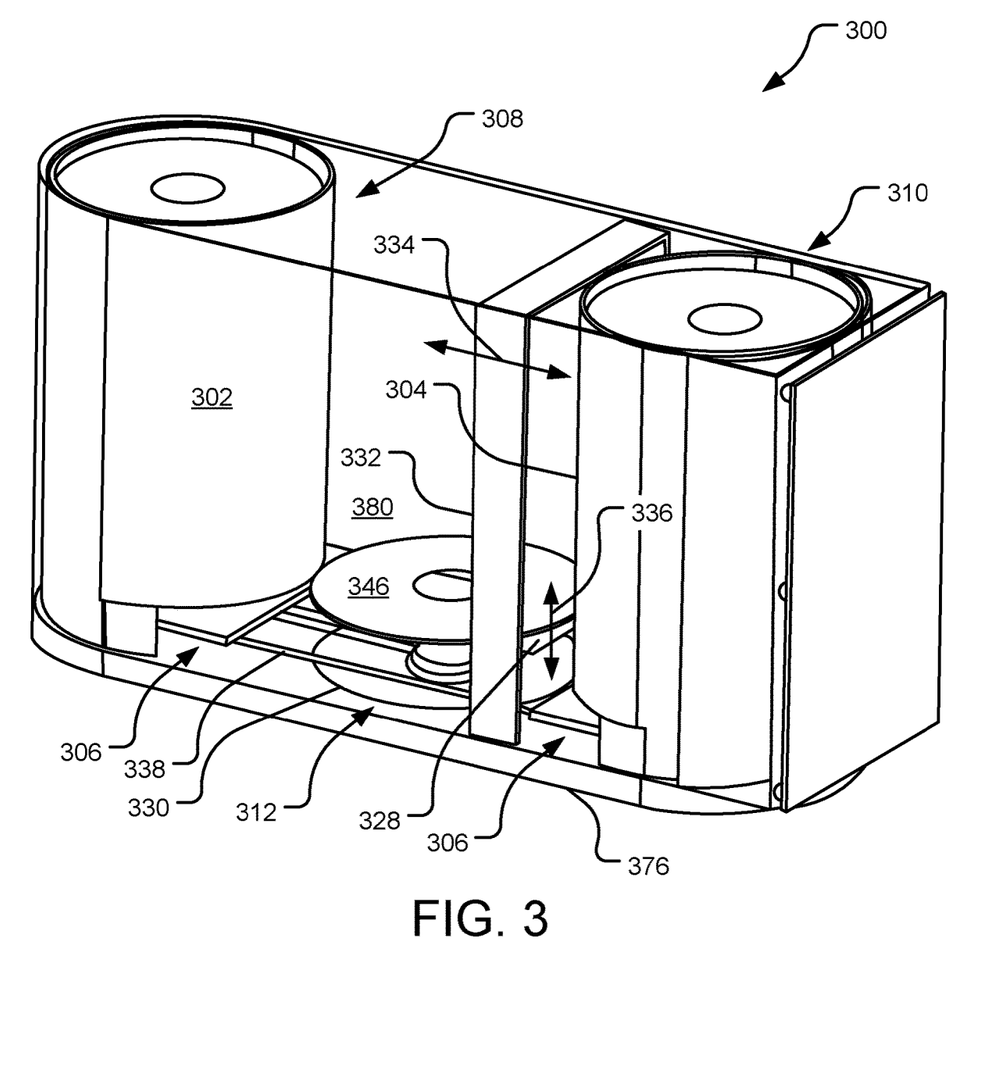
FIG. 3 illustrates an example HDD with cassette doors in a closed position and a shared read/write player door in an open position.

The shared read/write player 112 is mounted to a base 176 of the HDD 100 below the shared read/write player door 106. The shared read/write player door 106 includes four distinct panels 114, 116, 118, 120. In the closed position depicted in FIG. 1, the panels 114, 116, 118, 120 are spread out across the top of the shared read/write player 112, with panels 116, 118 abutting. An example open position of the shared read/write player door 106 is illustrated in FIG. 3, which is described in further detail below. In various implementations, the shared read/write player 112 is removable from the HDD 100 through an aperture in the base 176 and out of a bottom of the HDD 100.

In various implementations, the shared read/write player door 106 may be a component specifically of the base 176 or of the shared read/write player 112. Further, the shared read/write player door 106 may be comprised of a pair of redundant overlapping sets of doors panels, one set attached to the base 176 and the other set attached to the shared read/write player 112. If the shared read/write player door 106 is attached to the base 176, if and when the shared read/write player 112 is replaced, the shared read/write player door 106 maintains separation with the interior cavity 180 of the HDD 100 during the replacement of the shared read/write player 112. If the shared read/write player door 106 is attached to the shared read/write player 112, the shared read/write player door 106 may be replaced with the read/write player 112 as a singular unit, but the interior cavity 180 of the HDD 100 is exposed during the replacement of the shared read/write player 112. The two redundant sets of shared read/write player doors has the benefits of both options, with the increased complexity of operating two shared read/write player door sets.

The cassette doors 102, 104 and the shared read/write player door 106 are also referred to herein as internal access doors. While three distinct internal access doors 102, 104, 106 are illustrated and described, in other implementations, one or more of the internal access doors 102, 104, 106 may be omitted. For example, the cassette doors 102, 104 may be omitted while the shared read/write player door 106 remains. For further example, the shared read/write player door 106 may be omitted while the cassette doors 102, 104 remain. Still further, there may be additional internal access doors within the interior cavity 180 of the HDD 100 that may offer additional or different internal isolation of HDD 100 components. Some of the internal access doors 102, 104, 106 may have multiple panels (e.g., the shared read/write player door 106 includes four distinct sliding panels), while others are of a singular panel (e.g., the cassette doors 102, 104). All of the internal access doors 102, 104, 106 may be electrically, pneumatically, or hydraulically actuated, with or without limit switches to define their overall travel.

Hard disc drives (HDDs) as used herein includes any magnetic disc storage system or jukebox having at least two or more storage platters (or magnetic discs), a shared read/write player, and one or more internal access doors providing a level of internal physical separation within the magnetic disc storage system or jukebox. Appearances of the cassettes 108, 110, shared read/write player 112, storage platter 146, actuator arm 148, and other features of the HDD 100 are for illustration purposes only and the features are not drawn to scale. The various microelectronic components attached to the slider 164 may be referred to in total as a transducer head, and may include read components, write components, or both read and write components. The presently disclosed technology may apply to rotating disc storage drive technologies other than the magnetic domain HDD 100 depicted in FIG. 1 (e.g., optical disc drives).

Figure 2:
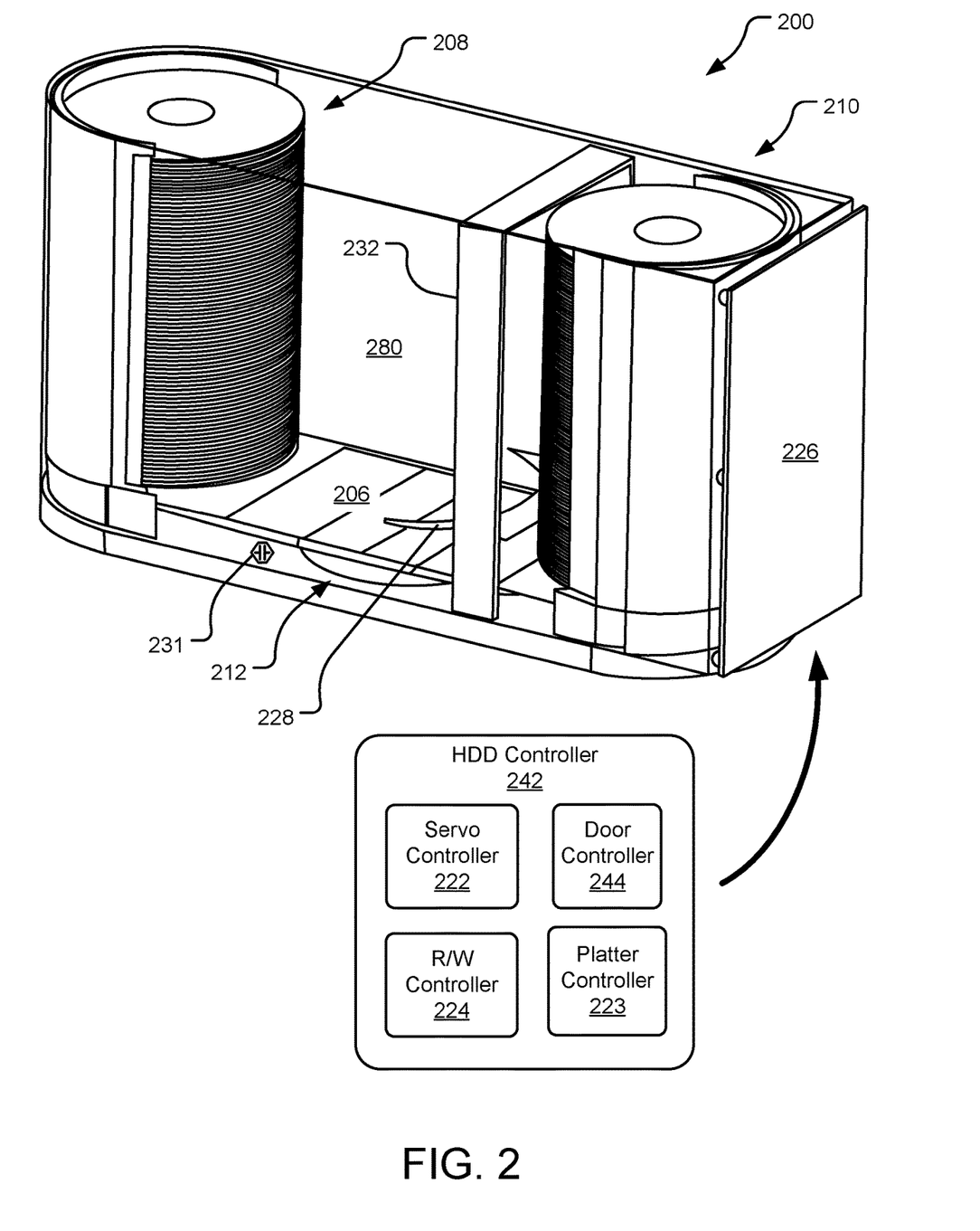
FIG. 2 illustrates an example HDD with cassette doors in an open position and a shared read/write player door in a closed position with an example HDD controller.

FIG. 2 illustrates an example HDD 200 with cassette doors (not shown, see e.g., cassette doors 102, 104 of FIG. 1) in an open position and a shared read/write player door 206 in a closed position with an example HDD controller 242. The HDD 200 is illustrated without its enclosure (see e.g., enclosure 440 of FIG. 4) for the purposes of illustrating internal components of the HDD 200, such as cassettes 208, 210 and shared read/write player 212. Each of the cassettes 208, 210 within the HDD 200 includes a stack of storage platters (or magnetic discs) in an inactive state (referred to herein as inactive discs). The shared read/write player 212 may hold one of the storage platters from the cassettes 208, 210 in a receptacle (not shown, see e.g., receptacle 330 of FIG. 3) or tray and perform read/write operations on that storage platter in an active state (referred to herein as active disc). The HDD controller 242 controls operation of the HDD 200, including but not limited to the cassette doors, the shared read/write player 212, and the shared read/write player door 206, as described in further detail below.

By example and without limitation, the HDD controller 242 includes a servo controller 222, a read/write (R/W) controller 224, a platter controller 223, and a door controller 244. The controller 242 is intended to represent a collection of hardware and software elements, including for example control instructions executed by one or more separate or shared device controllers (e.g., microprocessors), peripheral interface controllers (PICs), application-specific integrated circuits (ASICs), systems on chips (SoCs), etc. Some or all of the hardware utilized by the controller 242 may be included on printed circuit board 226, which is mounted to the HDD 200.

The servo controller 222 directs various operations of the shared read/write player 212, including but not limited to operation of a first motor controlling a platter spindle to control rotation of an active storage platter within the shared read/write player 212 and operation of a second motor controlling an actuator spindle to control rotation of an actuator arm within the shared read/write player 212. The servo controller 222 may select whether the shared read/write player 212 is in a standby mode (i.e., the active storage platter is not spinning, and a corresponding slider is parked) or the shared read/write player 212 is in an active mode (i.e., the active storage platter is spinning at a high speed and the slider is flying above the active storage platter). In the active mode, the active storage platter is ready for read/write operations.

Figure 7:
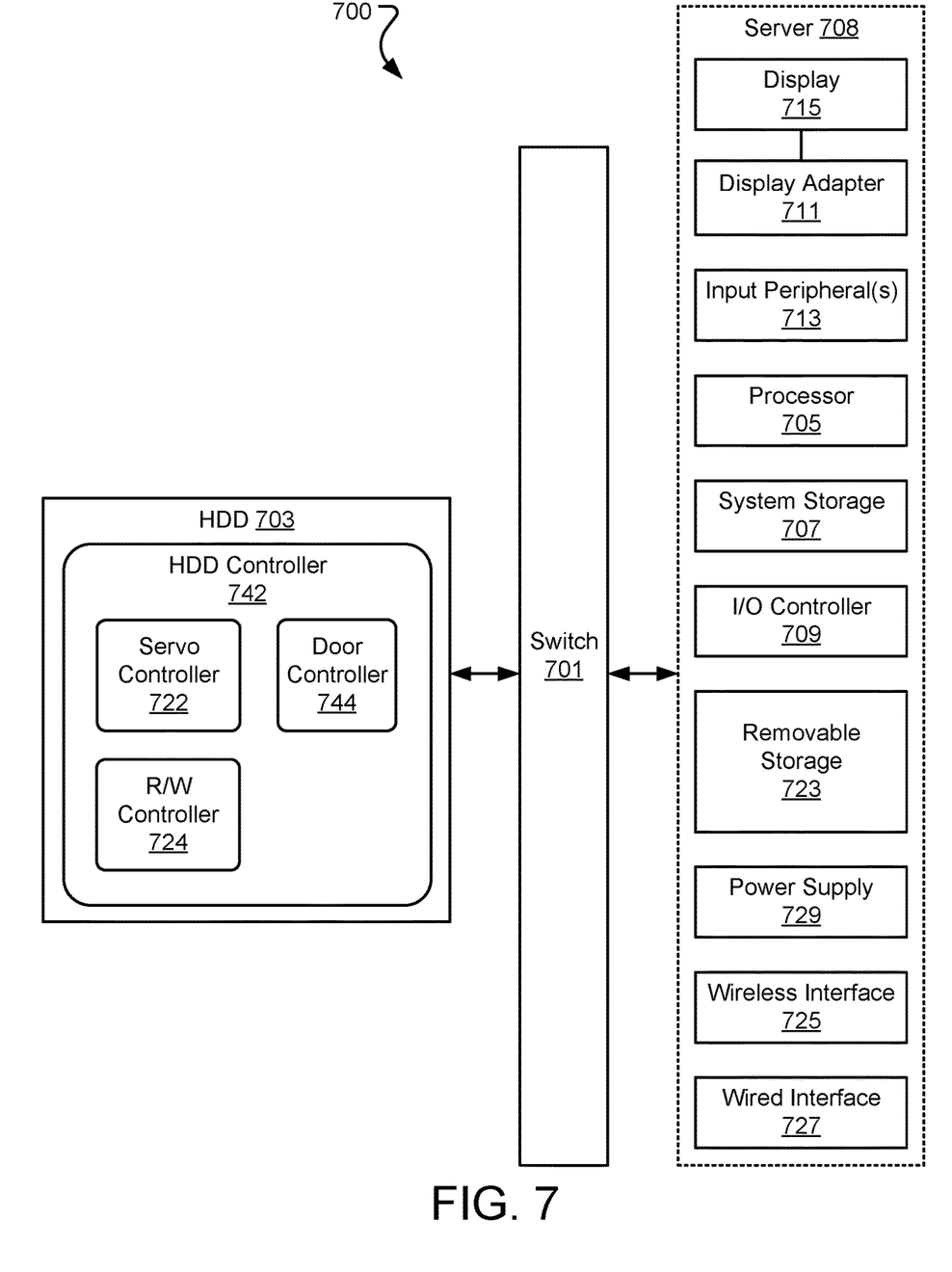
FIG. 7 illustrates an example system diagram of a computing system suitable for operating an HDD with one or more internal access doors.

The R/W controller 224 executes read and/or write commands received from a server (such as a system host or client, not shown, see e.g., server 708 of FIG. 7) on the active storage platter. For example, the R/W controller 224 may open a read/write channel, select a preamplifier and configure preamplifier settings for R/W operations, and/or control other electronics that facilitate data access (e.g., read and/or write access) to the active storage platter. The platter controller 223 directs operation of a robotic arm assembly, which in turn includes at least a sliding frame 232 and a robotic arm 228 to selectively physically move the storage platters between the cassettes 208, 210 and the shared read/write player 212. The robotic arm assembly is described in further detail below with reference to FIG. 3.

The door controller 244 directs operation of the cassette doors and the shared read/write player door 206, and thus access to the cassettes 208, 210 and the shared read/write player 212, respectively. For example, the HDD 200 may start in an off or standby condition with all of the cassette doors and the shared read/write player door 206 closed and no active disc in the shared read/write player 212, as illustrated by HDD 100 of FIG. 1. When the controller 242 receives a read from/write to request for one of the inactive storage platters stored within the cassettes 208, 210, the door controller 244 directs one or both of the cassette doors to open, as illustrated by HDD 200 of FIG. 2, so that robotic arm 228 may retrieve the requested storage platter from one of the cassettes 208, 210. Once the requested storage platter is retrieved, the door controller 244 may direct the cassette doors to close and the read/write player door 206 to open, as illustrated by HDD 300 of FIG. 3. The robotic arm 228 places the requested storage platter within the shared read/write player 212, and the door controller 244 directs the shared read/write player door 206 to close, as again illustrated by HDD 100 of FIG. 1.

In various implementations, the door controller 244 may enforce one or more rules regarding operation of the cassette doors and the shared read/write player door 206 to protect the HDD 200. For example, the door controller 244 may enforce that only one of the cassette doors is open at any point in time and lock the remaining doors closed. For further example, the door controller 244 may enforce that only the cassette doors or the shared read/write player door 206 is open any point in time and lock the other doors closed.

For still further example, the shared read/write player 212 may include a failure sensor 231 (e.g., a head-media contact sensor) that detects if and when a failure event occurs within the shared read/write player door 206 or elsewhere in the HDD 200 that could contaminate the inactive storage platters within the cassettes 208, 210. The failure sensor 231 may take the form of a particle detector, a microphone that monitors acoustics within the HDD 200, and/or a detector on the read channel monitoring for a signal indicating a failure event (indicating a head-media contact event or other failure event that generates a plume of debris), for example. The failure sensor 231 may further utilize acoustic energy or piezoelectricity as a mode of detection. In response to detection of such a failure event, the door controller 244 may close (if open) and enforce that none of the cassette doors and the shared read/write player door 206 are reopened (i.e., lock all the internal access doors) prior to a reset of the HDD controller 242 by a service technician. The door controller 244 operating in conjunction with the failure sensor 231 may be referred to herein as a contamination/crash detection system.

The HDD 200 depicted in FIG. 2 with the cassette doors in an open position and the shared read/write player door 206 in a closed position is operating in one of several states. First, the HDD 200 may be in a transitioning state, where it is in the process of retrieving one of the inactive storage platters to be used as an active storage platter or returning the active storage platter to its position within the cassettes 208, 210 as an inactive storage platter. In the case that the HDD 200 is retrieving one of the inactive storage platters to be used as an active storage platter, the cassette doors are opened to access the desired inactive storage platter and the robotic arm 228 is in position to retrieve the desired inactive storage platter. In the case that the HDD 200 is returning the active storage platter to its position within the cassettes 208, 210 as an inactive storage platter, the robotic arm 228 is in position to retrieve the active storage platter from the shared read/write player 212 once the shared read/write player door 206 is opened. The active storage platter is then returned to its position within the cassettes 208, 210 as an inactive storage platter.

The HDD 200 depicted in FIG. 2 with the cassette doors open and the shared read/write player door 206 in a closed position may also be operating in a partial standby or an active read/write state. In this case, all of the storage platters except one are stowed in their respective slots within the cassettes 208, 210 (referred to herein as the inactive discs) and the shared read/write player 212 contains the one storage platter in its receptacle or tray, which is referred herein as the active disc. The shared read/write player door 206 is in a closed position to isolate the active disc within the shared read/write player 212 from the inactive storage platters within the cassettes 208, 210 and the remainder of an interior cavity 280 of the HDD 200. With the shared read/write player door 206 closed, it may be unnecessary to also close the cassette doors to provide a desired level of isolation within the HDD 200. When operating in the partial standby state, the active disc is loaded within the shared read/write player 212, but not currently spinning. In the partial standby state, the cassette doors and the shared read/write player door 206 are all available to be opened, as requested by the HDD controller 242, in some implementations to change the active disc.

The cassette doors and the shared read/write player door 206 are also referred to herein as internal access doors. In various implementations, some or all of the depicted and described internal access doors may be omitted. Still further, there may be additional internal access doors within the interior cavity 280 of the HDD 200 that may offer additional or different internal isolation of HDD 200 components. Appearances of the cassettes 208, 210, shared read/write player 212, PCB 226, HDD controller 242, and other features of the HDD 200 are for illustration purposes only and the features are not drawn to scale. The presently disclosed technology may apply to rotating disc storage drive technologies other than the magnetic domain HDD 200 depicted in FIG. 2 (e.g., optical disc drives).

FIG. 3 illustrates an example HDD 300 with cassette doors 302, 304 in a closed position and a shared read/write player door 306 in an open position. The HDD 300 is illustrated without its enclosure (see e.g., enclosure 440 of FIG. 4) for the purposes of illustrating internal components of the HDD 300, such as cassettes 308, 310 and shared read/write player 312. Each of the cassettes 308, 310 within the HDD 300 includes a stack of storage platters (or magnetic discs) in an inactive state (referred to herein as inactive discs). The shared read/write player 312 may hold one of the storage platters (e.g., storage platter 346 from the cassettes 308, 310) in a receptacle 330 or tray and perform read/write operations on that storage platter in an active state (referred to herein as an active disc). An HDD controller (not shown, see e.g., HDD controller 242 of FIG. 2) controls operation of the HDD 300, including but not limited to the cassette doors 302, 304, the shared read/write player 312, and the shared read/write player door 306.

The HDD 300 includes a robotic arm assembly, which in turn includes at least a sliding frame 332 and a robotic arm 328. The sliding frame 332 is capable of sliding horizontally between the cassettes 308, 310, as illustrated by arrow 334, so that the robotic arm assembly may access the storage platters within both of the cassettes 308, 310. Further, the robotic arm 328 is capable of moving vertically along the sliding frame 332, as illustrated by arrow 336, so that the robotic arm assembly may access each of the storage platters stacked vertically within the cassettes 308, 310. The robotic arm 328 is further capable of rotating 180 degrees so that the robotic arm may be selectively oriented toward one of the cassettes 308, 310, and thus capable of selectively accessing storage platters within one of the cassettes 308, 310. The robotic arm 328 has the capability to grip a selected one of the storage platters within the cassettes 308, 310 or an active storage platter within the shared read/write player 312 so that the robotic arm 328 may move the storage platter from its original location within the HDD 300 to a new location within the HDD 300. In other implementations, the robotic arm 328 may function as a tray and rely on gravity to lift and relocate a selected one of the storage platters within the HDD 300.

The shared read/write player 312 is mounted to a base 376 of the HDD 300 below the shared read/write player door 306. In an open position, as illustrated in FIG. 3, individual distinct panels (e.g., panels 114, 116, 118, 120 of FIG. 1) are retracted such that they are stacked upon one another underneath the cassettes 308, 310. Specifically, panels 114, 116 as illustrated in FIG. 1 may retract and stack underneath cassette 308, while panels 118, 120 as illustrated in FIG. 1 may retract and stack underneath cassette 310. The panels, the shared read/write player door 306, and/or the base 376 of the HDD 300 may include guide rails (e.g., guide rail 338) and corresponding channels (not shown) to limit movement of the panels in a linear direction for opening and closing the shared read/write player door 306. An example closed position of the shared read/write player door 306 is illustrated in FIG. 1 and described in detail above.

The HDD 300 with the cassette doors 302, 304 in a closed position and the shared read/write player door 306 in an open position is operating in a transitioning state. Specifically, the HDD 300 is in the process of retrieving the storage platter 346 from one of the cassettes 308, 310 to be used as an active storage platter or returning the storage platter 346 to its position within one of the cassettes 308, 310 as an inactive storage platter. In the case that the HDD 300 is retrieving storage platter 346 to be used as an active storage platter, the robotic arm 328 has retrieved storage platter 346 from the one of the cassettes 308, 310 and is in position to place the storage platter 346 within the receptacle 330 of the shared read/write player 312. In the case that the HDD 300 is returning the storage platter 346 to its position within one of the cassettes 308, 310 as an inactive storage platter, the robotic arm 328 has retrieved the storage platter 346 from the shared read/write player 312 and is awaiting one or both of the cassette doors 302, 304 to be opened, as illustrated in FIG. 2.

The cassette doors 302, 304 and the shared read/write player door 306 are also referred to herein as internal access doors. In various implementations, some or all of the depicted and described internal access doors may be omitted. Still further, there may be additional internal access doors within an interior cavity 380 of the HDD 300 that may offer additional or different internal isolation of HDD 300 components. Appearances of the cassettes 308, 310, the shared read/write player 312, the robotic arm assembly, and other features of the HDD 300 are for illustration purposes only and the features are not drawn to scale. The presently disclosed technology may apply to rotating disc storage drive technologies other than the magnetic domain HDD 300 depicted in FIG. 3 (e.g., optical disc drives).

Figure 4:
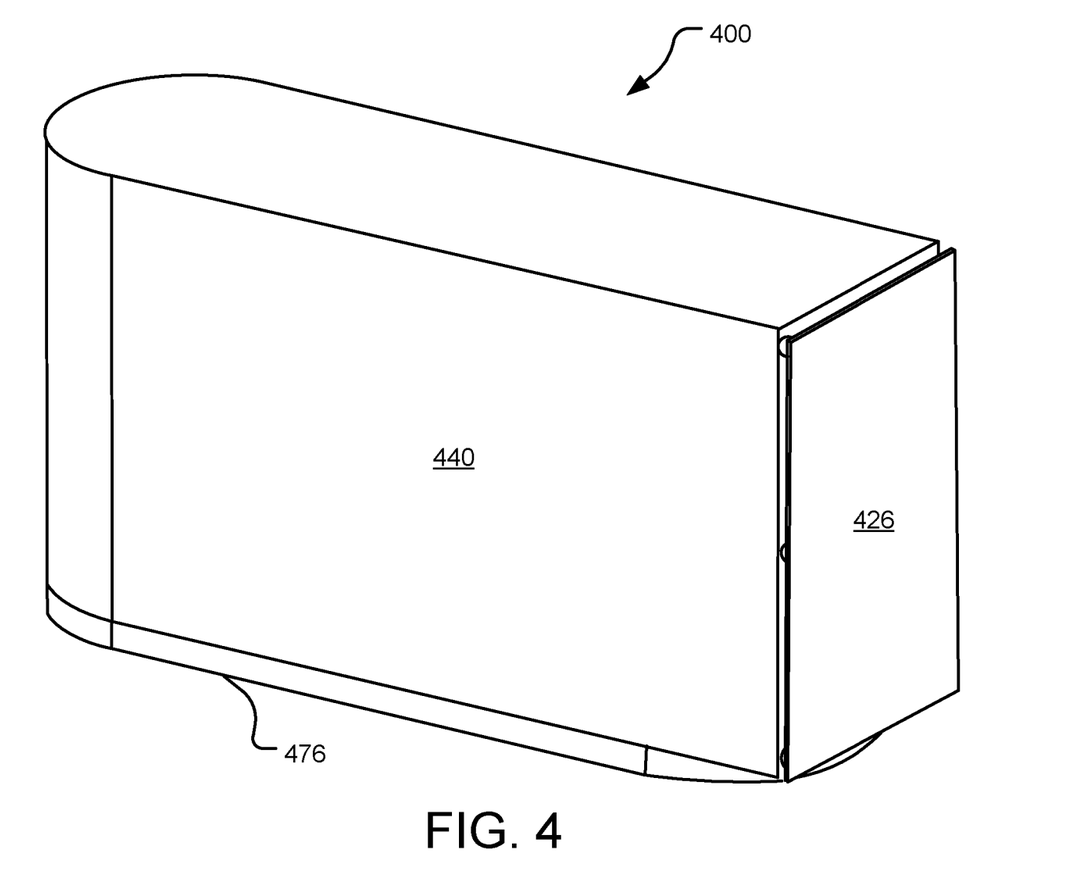
FIG. 4 illustrates an example enclosure for an HDD with one or more internal access doors.

FIG. 4 illustrates an example enclosure 440 for an HDD 400 with one or more internal access doors (not shown, see e.g., internal access doors 102, 104, 106 of FIG. 1). The enclosure 440 seals internal components of the HDD 400, such as one or more storage platter cassettes and a shared read/write player, within an interior cavity (not shown, see e.g., interior cavity 180 of FIG. 1) of the HDD 400. The enclosure 440 may be water-tight and/or air-tight and may establish an inert environment (e.g., a helium or nitrogen gas mixture, a low water vapor mixture, etc.) within the HDD 400. The inert environment may be maintained at atmospheric pressure, or a predetermined higher or lower differential pressure referenced to atmospheric pressure. Tight control of the environment within the HDD 400 may prolong longevity of the HDD 400, particularly when used in conjunction with the internal access doors disclosed herein to isolate any device failure event (e.g., a head-media contact event) that may negatively impact the environment within the HDD 400. In various implementations, the enclosure 440 may be purged and the inert environment may be re-established following any maintenance activity that opens the enclosure 440. Further, the enclosure 440 may include a gas circulation system with filtration to ensure that the inert environment within the HDD 400 stays clear of particulate matter. The filtration system is capable of addressing relatively small quantities of particulate matter that may originate within the HDD 400, such as that remaining from prior maintenance access within the enclosure 440, or that may be generated outside of the HDD 400 and enter the HDD 400 through a leak in the enclosure 400. Larger quantities of particulate matter generated by, for example, a head-media contact event, may trigger a door controller to close the internal access door(s) within the HDD 400. Further, the filtration system may be located in particularly sensitive areas of the HDD 400, such as near the shared read/write player.

The enclosure 440 may attach to a base 476 of the HDD 400 and may be selectively removed from the base 476 by a technician, if necessary, to preform maintenance or repair operations on the HDD 400. PCB 426 may embody an HDD controller (not shown, see e.g., HDD controller 242 of FIG. 2), which controls operation of the HDD 400, including but not limited to the internal access doors and/or the shared read/write player. The PCB 426 may be mounted exterior to the enclosure 440, as shown, to allow for maintenance or replacement of the PCB 426 without opening the enclosure 440. In other implementations, the PCB 426 may be mounted inside the enclosure 440.

Figure 5:
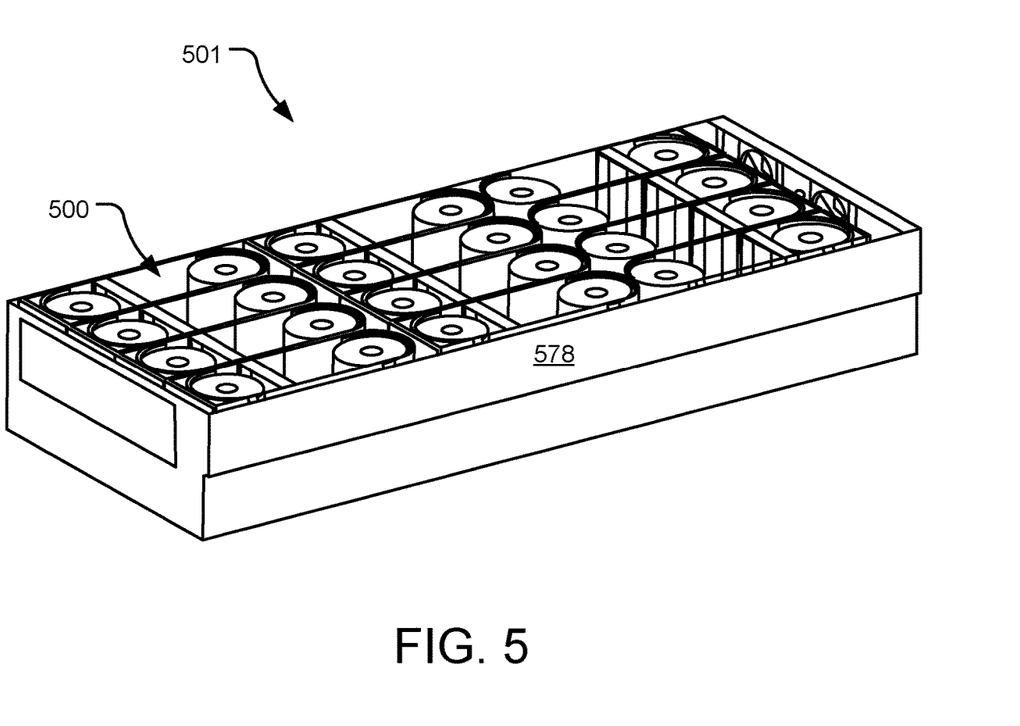
FIG. 5 illustrates an example data storage rack containing an array of HDDs, each with one or more internal access doors.

FIG. 5 illustrates an example data storage rack 501 containing an array of HDDs (e.g., HDD 500), each with one or more internal access doors. The data storage rack 501 is illustrated with a housing 578 containing a 3×4 array of 12 total HDDs, however, other implementations may include any number of HDDs within the physical limitations of the housing 578. The data storage rack 501 forms a structural framework for mounting a variety of information technology (IT) equipment. One or several data storage racks, such as data storage rack 501, may be used within a variety of businesses to house equipment to meet IT needs. Numerous data storage racks, such as data storage rack 501 may be used within data centers for cloud computing data storage, for example.

Data storage racks may be designed to accommodate a common physical size and shape format for the IT equipment. Accordingly, in additional to the depicted HDDs, a variety of IT equipment may be also located within the data storage rack 501 to meet its intended purpose. For example, data storage rack 501 may include a router that serves to direct data flow to and from the data storage rack 501 and a server to run programs and/or provide functionality for external devices, such as a client (in a client—server model). The server can provide various functionalities, referred to herein as services, such as retrieving requested data for the client from the HDDs or storing incoming data from the client on the HDDs. The server may also share data or resources among clients or perform computations for the client. The data storage rack 501 may further include a network switch that serves to interconnect the IT equipment within the data storage rack 501 and a power supply to receive and convert incoming power to a voltage, current, and frequency appropriate to power the IT equipment within the data storage rack 501.

In various implementations, each of the HDDs within the data storage rack 501 may be replaceable without affecting the other HDDs, and perhaps without taking the data storage rack 501 out of service for the HDD replacement. Further, the data storage rack 501 may include greater or fewer of the IT equipment described above. Still further, the data storage rack 501 may include multiples of any of the IT equipment described above. Depending upon the intended use of the data storage rack 501, the size, appearance, and arrangement of the data storage rack 501 and the IT equipment housed therein may vary widely from that shown in FIG. 5 and described herein.

Figure 6:
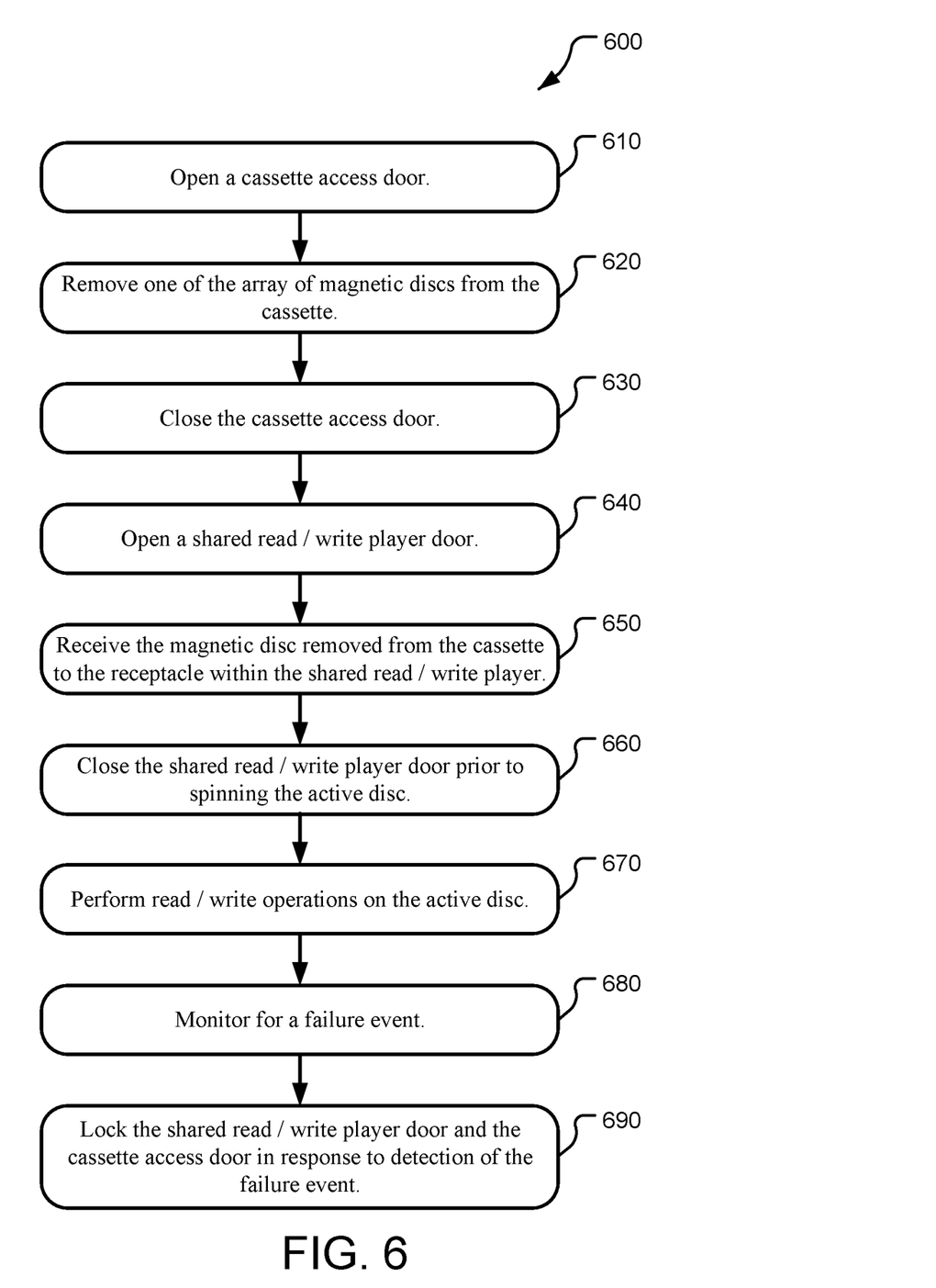
FIG. 6 illustrates example operations for operating an HDD with one or more internal access doors.

FIG. 6 illustrates example operations 600 for operating an HDD with one or more internal access doors. A first opening operation 610 opens a cassette access door. The cassette access door selectively permits physical access to a cassette of magnetic discs within the HDD. In some implementations, the HDD includes multiple cassettes, each with its own cassette access door. A removing operation 620 removes one of the array of magnetic discs from the cassette. The removed magnetic disc is intended to be used as an active disc within the HDD. A closing operation 630 closes the cassette access door. In various implementations, the closing operation 630 is explicitly performed prior to the following second opening operation 640 to prevent multiple internal access doors from being simultaneously open within the HDD.

The second opening operation 640 opens a shared read/write player door. The shared read/write player door selectively permits physical access to a receptacle within a shared read/write player of the HDD. The shared read/write player is used to perform read/write operations on the active disc, which is selected from numerous magnetic discs within the HDD. The remaining magnetic discs within the HDD are referred to herein as inactive discs. A receiving operation 650 receives the removed magnetic disc to the receptacle within the shared read/write player as the active disc. A second closing operation 660 closes the shared read/write player door prior to spinning the active disc within the shared read/write player.

A performing operation 670 performs read/write operations on the active disc as it spins within the shared read/write player. While the performing operation 670 is ongoing, a monitoring operation 680 monitors the HDD for a failure event, such as a head-media contact event. In some implementations, the monitoring operation 680 is not limited to times concurrent with the performing operation 670, or even concurrent with the active disc spinning within the shared read/write player. Should a failure event be detected, a locking operation 690 locks the shared read/write player door and the cassette access door closed. The shared read/write player door and the cassette access door may remain closed and locked until a service technician performs any required repairs to the HDD and releases the locks. The locks may be implemented and enforced in computer logic only or have a physical locking component.

The foregoing logical operations 600 may be implemented as logical steps in one or more computer systems (e.g., as a sequence of processor-implemented steps executing in one or more computer systems and as interconnected machine or circuit modules within one or more computer systems), such as computing system 700 discussed below. The implementation is a matter of choice, dependent on the performance requirements of the computer system implementing the presently disclosed technology. Accordingly, the logical operations 600 may be referred to variously as operations, steps, objects, or modules. Furthermore, it should be understood that the logical operations 600 may be performed in any order, adding or replacing operations as desired, unless explicitly claimed otherwise or a specific order is inherently necessitated by the claim language.

FIG. 7 illustrates an example system diagram of a computing system 700 suitable for operating an HDD 703 with a shared read/write player and one or more internal access doors. The HDD 703 includes an HDD controller 742, which in turn includes a servo controller 722, R/W controller 724, and a door controller 744. The HDD 703 further includes a number of storage media platters (e.g., storage media platter 146 of FIG. 1) arranged in one or more cassettes, data on which is accessible via the servo controller 722 and the R/W controller 724 as described in detail above. The door controller 744 directs operation of the internal access doors and thus physical access to the cassettes and the shared read/write player.

Server 708 manages access to the HDD 703 via a data storage rack switch 701, which interconnects IT components within a data storage rack or other computing system. The server 708 includes major subsystems such as a processor 705, system storage 707 (such as random-access memory (RAM) and read-only memory (ROM)), an input/output (I/O) controller 709, removable storage (such as a memory card) 723, a power supply 729, and external devices such as a display screen 715 via a display adapter 711, and various input peripherals 713 (e.g., a mouse, trackpad, keyboard, touchscreen, joystick, and/or smart card acceptance device). Wireless interface 725 together with a wired network interface 727, may be used to interface to the HDD 703, a data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 7 to be present to practice the presently disclosed technology. Furthermore, devices and components thereof may be interconnected in different ways from that shown in FIG. 7. Code (e.g., computer software, including mobile applications (apps) to implement the presently disclosed technology may be operably disposed in the HDD 703, the system storage 707, and/or the removable storage 723.

The computing system 700 may include a variety of tangible computer-readable storage media (e.g., the HDD 703, the system storage 707, and/or the removable storage 723) and intangible computer-readable communication signals. Tangible computer-readable storage can be embodied by any available media that can be accessed by the computing system 700 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information, and which can be accessed by the computing system 700.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A hard disc drive comprising:
a cassette including an array of magnetic discs;
a shared read/write player including a receptacle to selectively receive one of the array of magnetic discs as an active disc, the shared read/write player to access the active disc as it spins; and
one or more internal access doors, the one or more internal access doors to selectively permit access to one of the receptacle and the cassette, the one or more internal access doors to remain closed while the active disc is spinning.

2. The hard disc drive of claim 1, wherein the one or more internal access doors include one or both of:
a cassette door to selectively permit access to the array of magnetic discs; and
a shared read/write player door to selectively permit access to the receptacle.

3. The hard disc drive of claim 2, wherein the cassette door includes one or more rotating panels that selectively overlap with a fixed interior wall to permit access to the array of magnetic discs.

4. The hard disc drive of claim 2, wherein the shared read/write player door includes one or more sliding panels that selectively stack beneath the cassette to permit access to the array of magnetic discs.

5. The hard disc drive of claim 1, wherein the hard disc drive is a hard disc juke box.

6. The hard disc drive of claim 1, further comprising:
a door controller to direct access to the receptacle and the cassette.

7. The hard disc drive of claim 6, wherein the door controller is further configured to lock the one or more internal access doors closed in response to detection of a failure event.

8. The hard disc drive of claim 7, further comprising:
a failure sensor, wherein the door controller is to lock the one or more internal access doors closed in response to a signal received from the failure sensor.

9. The hard disc drive of claim 1, wherein the shared read/write player includes:
a spindle motor to spin the active disc;
a read/write arm to selectively access a track on the active disc; and
a read head to selectively read data from the active disc.

10. The hard disc drive of claim 9, wherein the shared read/write player further includes:
a write head to selectively write data to the active disc.

11. The hard disc drive of claim 1, further comprising:
a robotic arm assembly to selectively retrieve one of the array of magnetic discs within the cassette and place the retrieved magnetic disc within the receptacle.

12. The hard disc drive of claim 1, further comprising:
one or more additional cassettes, each including an array of magnetic discs, wherein the shared read/write player is to selectively receive one magnetic disc from all of the cassettes as the active disc.

13. The hard disc drive of claim 1, further comprising:
an enclosure isolating an interior cavity hard disc drive from an external environment.

14. The hard disc drive of claim 1, wherein the shared read/write player is removable from a bottom of the hard disc drive.

15. A method of operating a hard disc drive comprising:
opening a shared read/write player door, the shared read/write player door to selectively permit physical access to a receptacle within a shared read/write player;
receiving one of an array of magnetic discs from a cassette to the receptacle within the shared read/write player as an active disc, the shared read/write player to access the active disc as it spins; and
closing the shared read/write player door prior to spinning the active disc within the shared read/write player, the shared read/write player to access the active disc as it spins.

16. The method of claim 15, further comprising:
opening a cassette access door, the cassette access door to selectively permit physical access to the cassette;
removing one of the array of magnetic discs from the cassette to be the active disc; and
closing the cassette access door prior to opening the shared read/write player door.

17. The method of claim 16, further comprising:
detecting a failure event; and
locking the shared read/write player door and the cassette access door closed in response to detection of the failure event.

18. A data storage rack comprising:
an array of hard disc drives, each within its own enclosure and including:
a cassette including an array of magnetic discs;
a shared read/write player including a receptacle to selectively receive one of the array of magnetic discs as an active disc, the shared read/write player to access the active disc as it spins; and
one or more internal access doors, the one or more internal access doors to selectively permit access to one of the receptacle and the cassette, the one or more internal access doors to remain closed while the active disc is spinning.

19. The data storage rack of claim 18, wherein the one or more internal access doors within each enclosure include one or both of:
a cassette door to selectively permit access to the array of magnetic discs; and
a shared read/write player door to selectively permit access to the receptacle.

20. The data storage rack of claim 18, wherein each of the hard disc drive enclosures are removable from the data storage rack.

* * * * *